No. 788,894. PATENTED MAY 2, 1905.
D. J. EVANS.
SUPPLEMENTAL SEAT ATTACHMENT FOR BICYCLES.
APPLICATION FILED NOV. 14, 1904.
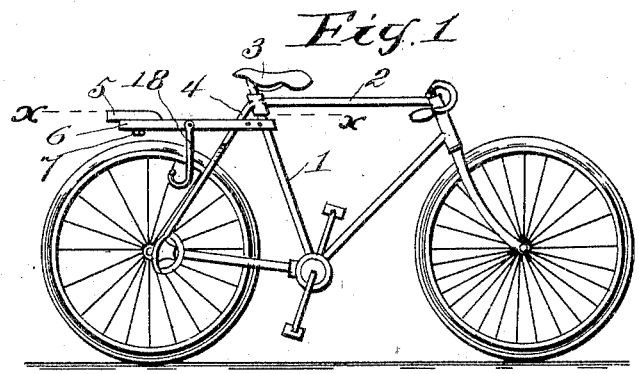
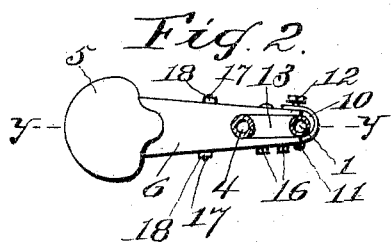
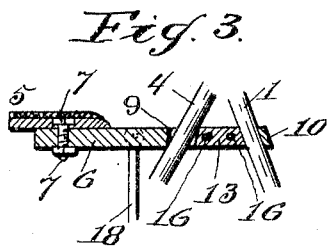
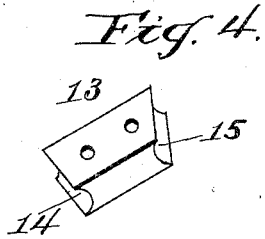
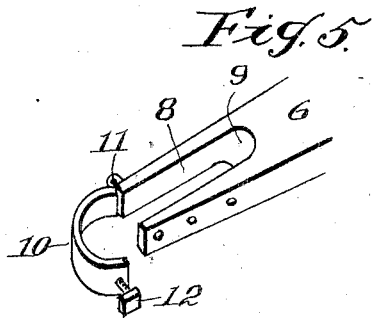
Witnesses
C. J. Belt
L. E. Money
Inventor
David J. Evans
By W. H. Wills,
Attorney No. 788,894. Patented May 2, 1905.

UNITED STATES PATENT OFFICE.

DAVID J. EVANS, OF PHILIPS, ARKANSAS.

SUPPLEMENTAL-SEAT ATTACHMENT FOR BICYCLES.

SPECIFICATION forming part of Letters Patent No. 788,894, dated May 2, 1905.

Application filed November 14, 1904. Serial No. 232,646.

*To all whom it may concern:*

Be it known that I, DAVID J. EVANS, a citizen of the United States, residing at Philips, in the county of Lee and State of Arkansas, have invented certain new and useful Improvements in Supplemental-Seat Attachments for Bicycles, of which the following is a specification.

This invention relates to bicycle attachments, and pertains especially to a supplemental or auxiliary seat and means for detachably securing it to the frame of a bicycle.

The object of the invention is to provide a device capable of being suspended by and at the rear of a bicycle-frame independent of braces and suspending or supporting elements other than the ordinary or usual frame of a bicycle and adapted to carry a person or articles for transportation.

A further object of the invention is to provide a seat-arm one end of which is adapted to have a seat detachably secured thereto and the other end of which being provided with an opening or openings to fit the saddle-post tube of the bicycle-frame and the rear fork or uprights of the frame and a block fitting said opening between the said frame parts, whereby the seat-arm is fulcrumed to and suspended from the frame.

Various devices have been employed for attaching supplemental seats; but as far as known to me such devices have supporting-rods, brace-bars, or similar elements to support the seats usually from the axle of the rear wheel. It is the purpose of this invention to avoid the use of such elements as above mentioned, to simplify and lessen the expense of supplemental-seat attachments, and to overcome various other objections found in the ordinary means of attaching such seats.

In the accompanying drawings, forming part of this application, Figure 1 is a side elevation of a bicycle, illustrating my invention. Fig. 2 is an enlarged section on the line *x x*, Fig. 1. Fig. 3 is a section on the line *y y*, Fig. 2. Fig. 4 is a detail perspective view of the block. Fig. 5 is an inverted perspective view of the slotted end of the seat-arm. Fig. 6 is a top view of a modified form of seat-arm.

The same numeral references denote the same parts throughout the several views of the drawings.

The bicycle used to exemplify the invention is of the well-known chainless type, having the ordinary saddle-post frame-tube 1, horizontal bar 2, saddle 3, and rear frame-fork 4.

The supplemental seat 5 is attached to the seat-arm 6 by a bolt 7, and the seat-arm has a slot or opening 8 in its end opposite the seat end. This opening or slot 8 terminates in a semicircular inclined bearing 9 and is opened and closed by a clip 10, pivoted at 11 and provided with a set-screw 12 for holding the clip in closed position. The arm 6 tapers from the slotted end of the seat to the outer end, so that the latter end is twice as wide as the slotted end. This shape not only produces strength and durability, but forms a mud-guard over the wheel of the bicycle. A wedge-shaped block 13, having arc-shaped inclined bearings 14 and 15, is detachably secured in the slot or opening 8 by means of bolts 16, and the arm has pintles 17, from which are hung stirrups or foot-rests 18. The arm 6 is positioned by pushing its slotted end over the rear fork-stem until the latter engages the bearing 9. The block is slipped into the arm opening or slot and fastened there, and the clip is locked around the post-tube. Then the arm will tighten itself on the said frame parts under pressure or weight at its seat end, and in carrying a person or package the arm makes a fulcrum-bearing on the said frame parts, so that the greater the weight on the outer end of the arm the more firmly will the inner end of the arm grip the frame parts.

Referring to the modification shown in Fig. 6, the arm 19 has curved prongs 20 to engage the ordinary rear brace-rods in lieu of the rear fork of a bicycle in the types of the latter which have such rods reaching from the saddle-post to the rear-wheel axle, and the same effect is gained in attaching this arm as in the form first described.

It is obvious that the seat end of the arm may be provided with suitable straps or tape for attaching parcels or packages thereto, that in such use of the arm the stirrups may be removed, and that the seat may or may not be removed.

It will be seen that the block forms a brace between the parts of the frame at the points of attachment of the seat-arm and that the bearings of the block are inclined, so as to follow the inclination of said frame parts.

Having thus described my invention, what I claim as new, and desire to secure by Letters Patent, is—

1. The combination, with a bicycle, and a supplemental seat, of an arm carrying the seat, and having an open or slotted end, a block detachably secured in the slot, and a clip to close the slot.

2. A supplemental-seat attachment for bicycles, comprising an arm to one end of which the seat is attached, the other end having a slot terminating in an inclined bearing, a block fitting the slot and having bearings which incline toward each other, and a clip to close the slot.

In witness whereof I hereunto set my hand in the presence of two witnesses.

DAVID J. $\overset{his}{\times}$ EVANS.
mark

Witnesses:
J. M. ALEXANDER,
ERNEST M. NABORS.